Patented Jan. 12, 1932

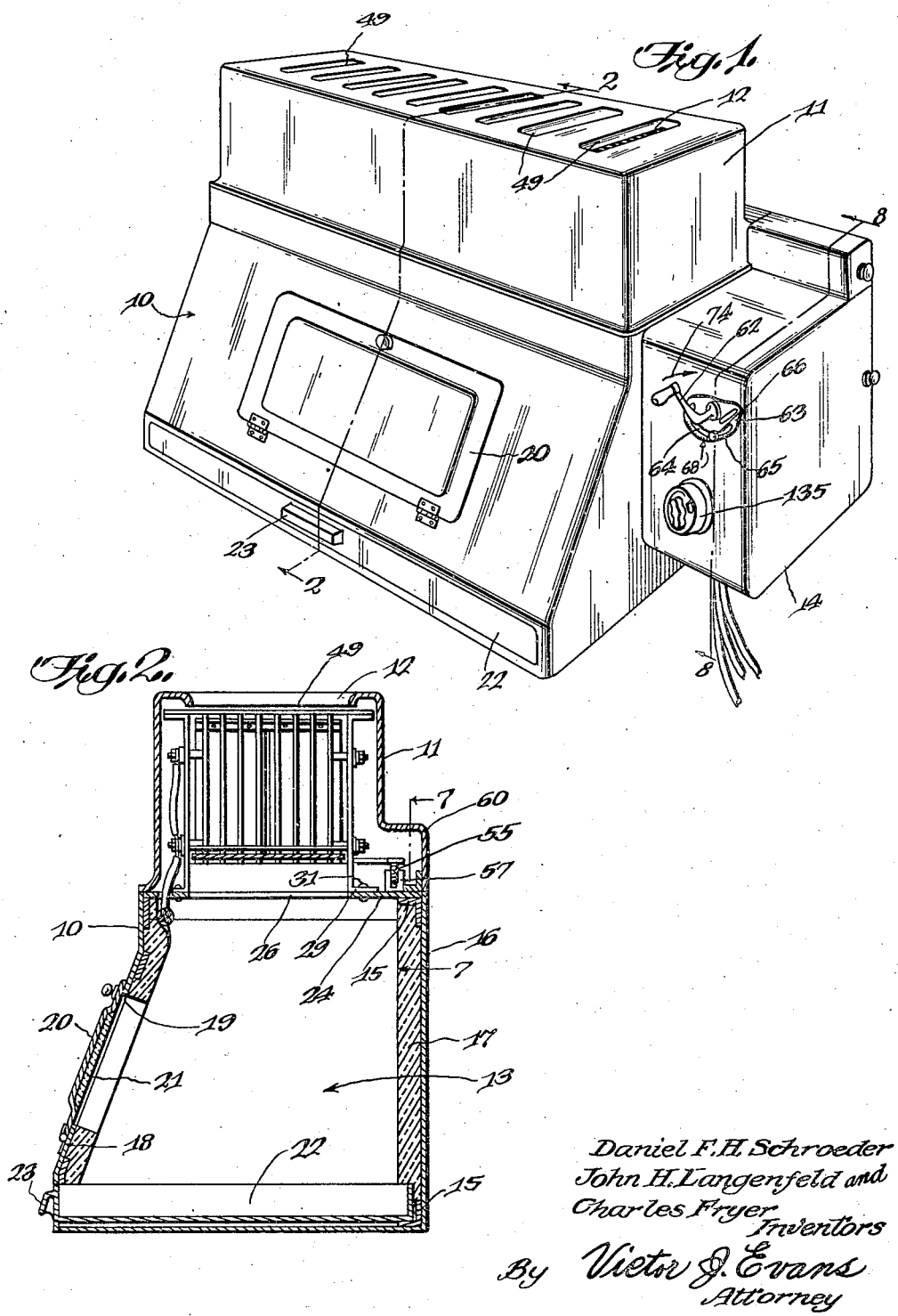

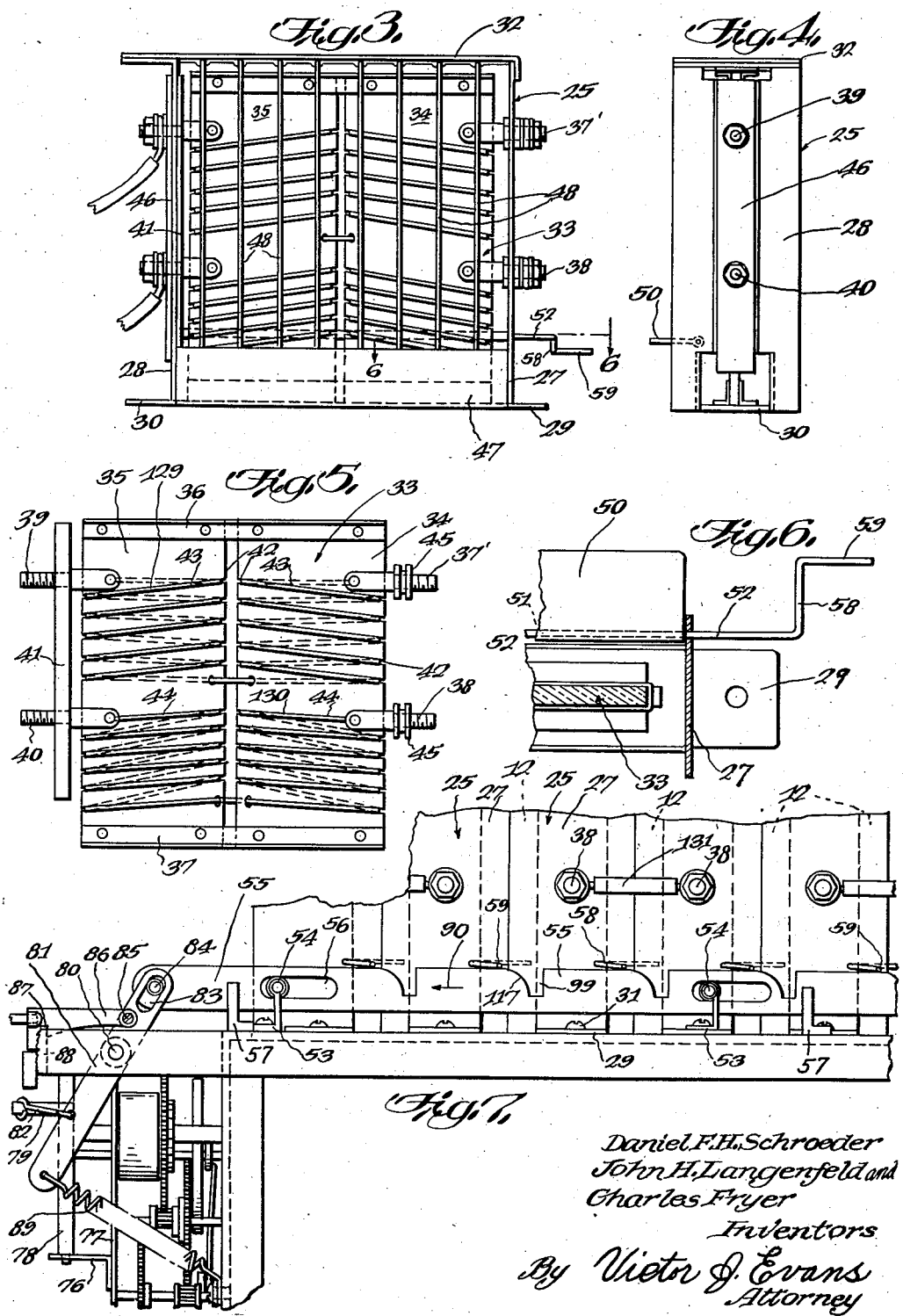

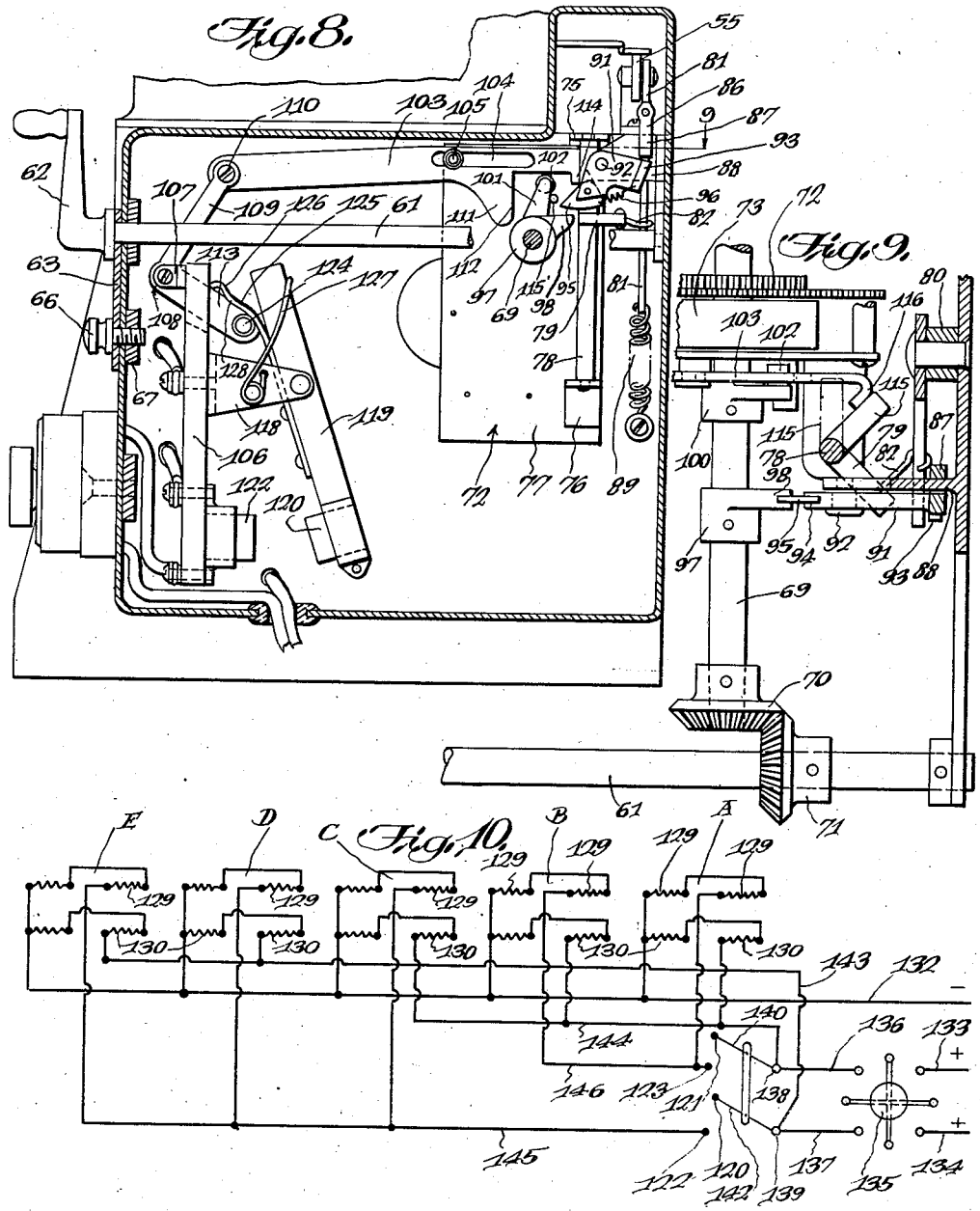

1,841,301

UNITED STATES PATENT OFFICE

DANIEL F. H. SCHROEDER, JOHN H. LANGENFELD, AND CHARLES FRYER, OF CHICAGO, ILLINOIS

TOASTING DEVICE

Application filed May 16, 1928. Serial No. 278,235.

This invention relates to certain novel improvements in toasting devices, and has for its principal object a provision of an improved construction of this character which will be highly efficient in use and economical in manufacture.

The salient object of our invention is to provide a toasting mechanism into which the bread may be expeditiously inserted and from which the bread after toasting, may be expelled into an oven wherein it may be maintained in heated condition.

Another object of our invention is to arrange a device of the above named type so that the toasting operation for the bread will be carried out for a predetermined period at the end of which the bread will be caused to pass from the toasting compartments.

Another object of the invention, ancillary to the foregoing, is to arrange the device so that the time of the toasting period may be expeditiously varied.

A further object of the invention is to provide means for supporting the bread in the toasting compartment which will be arranged so that the means may be moved from supporting position to permit the passage of the bread from the toasting compartments.

A further object of the invention is to arrange the toasting compartments so that they will embody portions which may be expeditiously removed in the event replacement thereof becomes necessary.

A still further object of the invention is to arrange each of the toasting compartments so that the heat from one compartment will be prevented from radiating into adjacent compartments in order that the efficiency of the device may be maintained at a maximum.

A still further object of the invention is to arrange the device so that a portion of the heating elements employed in the toasting may be maintained in operable condition while the device is in operation in order to maintain the toast receiving compartment in heated condition and to arrange the device so that the other portions of the heating elements may be rendered inoperative after the bread has been discharged from the toasting compartments.

Other objects will appear hereinafter.

The invention consists in the novel combination and arrangement of parts to be hereinafter described and claimed.

The invention will be best understood by reference to the accompanying drawings, showing the preferred form of construction and in which;

Fig. 1 is a perspective view depicting a preferred form of construction for our invention;

Fig. 2 is a transverse sectional view taken substantially on the line 2—2 on Fig. 1;

Fig. 3 is a side elevational view of one of the heater elements mounted in the frame therefor;

Fig. 4 is an end elevational view of the device as illustrated in Fig. 3;

Fig. 5 is a side elevational view of one of the heater elements, depicting the same removed from the frame therefor;

Fig. 6 is a sectional detail view taken substantially on the line 6—6 on Fig. 3;

Fig. 7 is a sectional detail view taken substantially on the line 7—7 on Fig. 2;

Fig. 8 is a sectional view taken substantially on the line 8—8 on Fig. 1;

Fig. 9 is a sectional detail view taken substantially on the line 9—9 on Fig. 8; and Fig. 10 is a diagrammatic view depicting the electrical connections employed in the device.

In the drawings wherein we have illustrated a preferred form of construction for our device 10 indicates the main housing of our improved mechanism and this main housing has arranged thereabove a housing 11 in which the toasting compartments 12 are arranged. Disposed below the toasting compartments is a toast receiving compartment 13 and arranged at one end of the device is a housing 14 in which certain of the timing and operating mechanisms for the device are mounted.

As illustrated best in Fig. 2, the frame for the housing 10 is preferably formed from suitable strips of angle iron indicated by 15 in the drawings and suitable metallic sheets 16 serve to cover the area enclosed by these angle strips 15. The portion of the main frame 10 surrounding the toast receiving compartment 13 is preferably lined with a suitable heat resisting material such as asbestos and this lining is indicated by 17. Preferably, though not necessarily, the front wall 18 of the toast receiving compartment 13 is disposed at an angle as clearly illustrated in Figures 1 and 2. An opening 19 is provided in this wall 18 which affords access into the toast receiving compartment 13. The opening 19 is normally closed by a door 20 which when disposed in open position and arranged substantially horizontal will provide a work table. The door 20 is also lined with a suitable heat resisting material as indicated by 21. In the lower portion of the toast receiving compartment 13 is a removable drawer 22 that provides the lower wall of the toast receiving compartment 13. The drawer 22 has a handle 23 at the front end thereof to expedite the removal thereof from the front of the machine to permit the dumping of crumbs therefrom and this drawer 22 will be known hereinafter as the crumb tray 22.

Arranged above the top wall 24 of the toast receiving compartment 13 is, as stated, the housing 11 in which the toast receiving compartments 12 are provided. These toast receiving compartments are defined by the frame members generically indicated by 25 in the drawings. The housing 11 is supported by the wall 24 directly above the opening 26 provided in the wall 24.

The frames 25 include end portions 27 and 28 which have foot portions 29 and 30 in which openings are provided in order that securing elements 31 may be passed therethrough which are secured in suitable openings provided in the upper wall 24 adjacent the edges of the opening 26, as clearly illustrated in Figures 2 and 7. The frames 25 include upper wall portions 32 that are secured to the upper ends of the end walls 27 and 28 and it will thus be seen that the lower ends of these frames 25 are open and the extent of these open ends is substantially equal to the transverse extent of the opening 26. As best illustrated in Fig. 7, the frames 25 are arranged so that the edges of the end walls are disposed in abutting relation and thus a substantially continuous wall is formed along the sides of the device.

In each of the frames 25 a heating element construction 33 is mounted. Each of the heating element constructions 33 comprises, in the present instance, two vertically extending strips 34 and 35 which are preferably formed from asbestos or a similar heat resisting substance. The strips 34 and 35 are arranged so as to be coextensive and across the end portions thereof are secured strips 36 and 37 which serve to support the strips 34 and 35. Secured to each strip 34 adjacent the upper end thereof is a terminal 37' which extends outwardly from the free edge thereof and arranged in spaced relation to this terminal 37' and in juxtaposition to the lower edge of the strip 34 is another terminal 38. Arranged to extend outwardly from the free edge of the strip 35 and aligned with the terminals 37' and 38 are terminals 39 and 40 and these terminals are extended through openings in a strip of heat resisting material, such as asbestos, and this strip is indicated by 41 in the drawings. In the lateral edges of the strips 34 and 35 notches 42 are provided which are preferably arranged such that the notches on one edge are disposed in transverse alignment with the notches on the other edge. Sections of resistance wire are wound about the strips 34 and 35 and these sections of resistance wire are disposed in the notches 42. As is clearly illustrated in Fig. 5, a section of resistance wire indicated by 43 in the drawings has one end portion secured to the inner end of the terminal 37' and this section of resistance wire 43 is wound about the strip 34 for substantially one half of its length and this strip of wire is then extended across to the strip 35 and is wound thereabout so that it is directed upwardly and this end of the wire 43 is connected to the terminal 39. Similarly, a strip of resistance wire 44 has one end portion attached to the terminal 38 and this strip of wire is wound about the strip 34 so that it is downwardly directed and at a point adjacent the lower end of the strip 34 a section of wire 44 is directed across to the strip 35 and is wound thereabout so that it is directed upwardly and this end of the resistance wire is connected to the terminal 40. It will thus be seen that on each of the heating elements 33, two individual element sections are provided and these sections will be described more fully hereinafter. On each of the terminals 37' and 38 suitable insulating bushings 45 are provided and these bushings are disposed on the terminals at the point at which these terminals will be extended through the end wall 27. The strip of heat resisting material 41 is disposed in abutment with the end wall 28 and the terminals 39 and 40 extend through suitable openings in this end wall and a second strip of insulating material 46 is arranged on the outer side of the end wall 28. In this manner the heating elements 33 are mounted in the frames 25.

Extending between the end walls 27 and 28 at the lower ends thereof are strips such as 47. Bars 48 extend from the strips 47 to the top wall 42 of each of the frames 25. When the frames 25 are arranged in abutting relation, as hereinafter described and as clearly shown in Fig. 7, the space between the bars 48 within the juxtaposed frames 25 define the toasting compartments 12. In the upper wall of the housing 11 in alignment with each of the toasting compartments 12 openings 49 are provided and the untoasted bread is inserted into the toasting compartments 12 through these openings 49.

The bread is supported in the toasting compartments 12 by the shelf members 50. These shelf members 50 include a sleeve portion 51 through which a shaft 52 is extended. The shaft 52 is journaled in the end walls 27 and 28 and under normal conditions these shelf members 50 are supported in a horizontal position by mechanisms to be described hereinafter.

Suitably supported adjacent the rear edge on the wall 24 are brackets 53 (Fig. 7) which rotatably support rollers 54. A bar 55 is provided which has slots 56 therein in which the rollers 54 are supported and it will thus be seen that the bar 55 is arranged for sliding movement in a horizontal plane. As best shown in Fig. 2, substantially U-shaped brackets 57 are provided which hold the bar 55 in a vertical plane. The portions of the shafts 52 extending through the end walls 27 are elongated and include a right-angularly extending portion 58 and a portion 59 which extends at right-angles to the portion 58 and outwardly therefrom so as to be disposed parallel with but offset from alignment with the shaft 52. Portions 59 normally rest on the upper surface of the bar 55, as clearly illustrated in Fig. 7, and thus the shelf members 50 are held in substantially horizontal position so as to support the bread in the toasting compartments 12. As is clearly illustrated in Fig. 2, the housing 11 includes a portion 60 which encloses the bar 55 and the parts associated therewith.

In the housing 14 a shaft 61 is journaled and this shaft 61 has a handle 62 at the forward end thereof which is disposed extraneous of the housing 14. A plate 63 is secured to the shaft 61 behind the base of the handle 62. This plate 63 has a slot 64 provided therein and a similar slot is provided in the portion of the housing 14 aligned therewith and, as can be seen by referring to the drawings, this slot 64 is arcuate in shape. A stop 66 extends through the slot 64 and is secured in position by the nut 67. A pointer 68 is provided in the housing 14. As the shaft 61 is turned by the handle 62 the calibrations 65 on the plate 63 are moved into registration with the pointer 68 and thus the relative position of the mechanisms operable from the shaft 61 may be determined.

Journaled in the housing 14 and extended at right-angles to the shaft 61 is a shaft 69. A bevel-gear 70 is provided on the end of the shaft 69 and this bevel-gear 70 meshes with a bevel-gear 71 provided on the shaft 61. Therefore when movement is imparted to the shaft 61, the shaft 69 is also turned.

Mounted within the housing 14 is a clock mechanism generically indicated by 72 which may be of any approved form. This clock mechanism includes a main spring 73 that has an end portion thereof fixed to the shaft 69 and when the handle 62 is moved in the direction of the arrow 74 the spring 73 is placed under tension and the releasing of this spring is controlled through the clock mechanism 72 in a manner well understood in the art. It is therefore apparent that the handle 62 may be moved so as to be set in a predetermined position and inasmuch as movement of this handle 62 and the mechanisms connected thereto in the opposite direction is controlled through the medium of the clock works 72 it is apparent that a predetermined lapse of time will take place until the handle 62 resumes its stop position. As is best shown in Fig. 8, brackets 75 and 76 are secured to the outer wall 77 of the clock mechanism 72. A vertically extending shaft 78 is journaled in these brackets 75 and 76. Fixed to the shaft 78 is an arm 79 which extends outwardly therefrom as clearly illustrated in Figures 7 and 9. Pivotally mounted on the main frame of the device as indicated at 80 is an arm 81. A link 82 (Figures 7, 8 and 9) extends between the end of arm 79 and the arm 81. At the upper end of the arm 81 a slot 83 is provided and the pin 84 is provided on the end of arm 55 which terminates at this point. It will thus be seen that a pin and slot connection is provided between the arms 55 and 81. Pivotally connected to the arm 81 adjacent the slot 83, as indicated at 85, is a dog 86 which includes a bifurcated end portion 87 that normally rests in engaging position so as to embrace the rib 88. A spring 89 extends between the lower end of the arm 81 and the main frame of the device, as best illustrated in Fig. 7, and normally acts on the arm 81 so as to tend to pivot said arm about the pivot 80 whereby to move the bar 55 in the direction of the arrow 90, the engagement of the dog 86 with the rib 88 serving to prevent this movement.

The mechanisms for releasing the bifurcated end portion 87 from the rib 88 are best illustrated in Fig. 8. By referring to this figure it may be seen that a dog 91 is pivotally mounted, as indicated at 92, on the inner end of the rib 88. (See Fig. 9.) This dog 91 includes a portion 93 that is disposed below the bifurcated end portion 87. On the portion of the dog 91, opposite to the portion 93, a bifurcated end portion 94 (Fig. 9) is provided. Pivotally mounted in this bifurcated end portion 94 is a latch 95 which is normally held in engagement with the shoulder provided by the bifurcated end portion 94 through the medium of the spring 96 (Fig. 8). It is therefore apparent that the latch 95 may be pivoted upwardly away from the shoulder provided by the bifurcated end portion 94 but movement of the latch 95 in the opposite direction will also cause movement of the dog 91. Fixed on the shaft 69 is a collar 97 which has a boss 98 extending therefrom. When the shaft 69 is moved by manipulation of the handle 62 in the direction of the arrow 74 the boss 98 engages the latch 95 and pivots the same from engagement with the shoulder provided by the bifurcated end portion 94 and therefore the boss 98 may pass beyond the latch 95. Therefore when the handle 62 is released and movement in the opposite direction is started and controlled by the clock work 72 the boss 98 will engage the latch 95 and inasmuch as movement of the latch 95 in this direction will also cause movement of the dog 91 it is apparent that the portion 93 thereof will engage the bifurcated end portion 87 of the dog 86 and move the same from engagement with the rib 88 which will permit the spring 89 to pivot the bar 81 and thus move the bar 55 in the direction of the arrow 90.

In the bar 55 extending downwardly from the upper edge thereof at spaced apart intervals are notches 99 which, when the bar is disposed in normal position, are arranged in spaced relation with respect to the portions 59. However, when the bar 55 is moved in the direction of the arrow 90 these slots 99 move into alignment with the portions 59 and thus these portions fall into these slots, which rotates the shafts 52 and therefore the shelf members 50 are moved downwardly into a vertical position. Therefore the bread which has been supported in the toasting compartments 12 on the shelf members 50 will fall down into the toast receiving compartments 13. It should be noted that the shelf members 50 are free and that their movement downwardly is actuated only by their own weight and the weight of the bread resting thereon. It is therefore apparent from the foregoing description that the greater the distance the handle 62 is moved the longer the elapsed time will be before the boss 98 pivots the latch 91 to release the dog 87 and arm 81 and it is therefore apparent that the toasting time may be expeditiously controlled by the mere proper positioning of the arm 62 since it is apparent that when the shelf members 50 move from the supporting position the bread carried thereby will fall from toasting position and the toasting action will be interrupted.

It is apparent that when the arm 81 is pivoted in the manner hereinbefore set forth that the movement will be transmitted through the link 82 to the arm 79 to the shaft 78 and thus this shaft 78 will be rotated. It is also apparent that when the handle 62 is moved in the direction of the arrow 74 that the collar 100 mounted on the shaft 69 is also moved. This collar 100 has an arm 101 extending therefrom on which a roller 102 is mounted. A bar 103 which has a slot 104 provided therein through which the headed screw 105 is extended, the screw 105 being fixed in the wall 77. A plate of insulating material 106, to be described more fully hereinafter, is provided and adjacent the upper end of this strip 106 is a bearing 107 in which a bell crank lever 108 is journaled. The arm 109 of the bell crank lever 108 is pivotally connected as indicated at 110 to the arm 103. Extending from the lower edge of the bar 103 is a boss 111 which is aligned with the roller 102. Therefore when the shaft 69 is turned in the manner hereinbefore set forth the roller 102 will engage the edge 112 of the boss 111 and move the bar 103 rearwardly and the movement of the bar 103 rearwardly will be transmitted to the bell crank lever 108 and at the time the roller 102 disengages the surface 112 the bell crank lever 108 will have been set in a position so that it will be under spring tension that will be controlled by a so-called over-center arrangement that will be associated with the arm 113 thereof and which will be described more fully hereinafter.

As the shaft 69 rotates, in the hereinbefore described direction of movement that is controlled by clock mechanism 72, the boss 98 will act to release the bar 55 in the manner hereinbefore set forth. At a time following this releasing of the bar 55, the roller 102 which will have passed over the surface 112 without moving the same, will engage the lug 114 depending from the lower edge of the bar 103 and will impart sufficient movement to this bar 103 to release it from the hereinbefore mentioned over-center position and this releasing of the bar 103 from the over-center position, due to the spring tension said bar has been under, will permit this bar to move forwardly in a rapid manner. On the shaft 78 an arm 115 is provided which extends substantially at right-angles with respect to the arm 79 and when the shaft 78 is moved in the manner hereinbefore set forth this arm 115 is moved into a position substantially similar to that shown by dotted lines in Fig. 9. The arm of the bar 103 includes a formed end 116 and when said arm is moved forwardly in a rapid manner just set forth, due to the spring tension said arm has been under, the formed end 116 will engage the arm 115 and thus move said arm so as to rotate the shaft 78. This will cause movement of the arm 79 which will be transmitted through the link 82 to the arm 81 which will pivot this arm 81 to bring the spring 89 under tension and also to bring the bifurcated end portions 87 again into engagement with the rib 88.

The slots 99 include formed edge 117 and when the bar 55 is moved, due to the just described pivoting of the arm 81, the portions 59 ride over these formed edges 117 and thus the shelf members 50 are again moved into the horizontal position and they will therefore be in position to receive untoasted pieces of bread and the hereinbefore described operation will again be repeated; namely, the resetting of the handle 62.

As has been stated an over-center device is associated with the arm 113 of the bell crank lever 108. This over-center device is in the form of a circuit opening mechanism and includes the following mechanisms. Mounted on the plate of insulating material 106 is a bracket 118 which supports two contact carrying arms such as 119 which carry the contacts 120 and 121. Stationary contacts 122 and 123 are carried by the plate 106 in alignment with the contacts 120 and 121. On the free end of the arm 113 a fiber roller 124 is mounted. On the arms 119 resilient arms such as 125 are mounted against which the fiber roller 124 engages. When the arm 103 is moved by the engagement of the roller 102 with the surface 112 the arm 113 is moved upwardly which forces the spring arms 125 inwardly toward the arms 119 and places the same under tension and just prior to the time at which the roller 102 disengages the surface 112, the fiber roller 124 will move into the locking portion 126 of the arms 125 and at this time the contacts 120 and 121 will have been moved into engagement with the contacts 122 and 123. At this same time the springs 127, which embrace the arms 119 that are fixed to the bracket 118, will have been placed under tension. Therefore when the roller 102 engages the portion 114 depending from the bar 103 movement will be imparted to the arm 113 such that the roller 124 will pass over the hump 128 provided in the arms 125 adjacent the locking portions 126 and at the time the roller 124 passes over the hump 128 the springs 127 will act so as to snap the arm 103 in the manner hereinbefore set forth and at this time the circuit will be interrupted between the contacts 120 and 121 and 122 and 123. Immediately following the engagement of the roller 102 with the portion 114, and after this roller has moved the arm 103 in the manner set forth, the arm 101 will engage the stop lug 115' and this will prevent further action by the clock movement 72 and thus interrupt movement of the mechanisms.

As has been pointed out hereinbefore the heating elements 33 each comprise two portions comprised of the resistance wire 43 and 44. The portion comprised of the resistance wire 43 will be known hereinafter as the high temperature winding 129 while the portion comprising the wire 44 will be known as the low temperature winding 130. By referring to the diagrammatic view, Fig. 10, the electrical connections to the various units may be viewed. As is indicated best in Fig. 7 the portions 129 and 130 of succeeding units are arranged in series and this is shown in Fig. 7 wherein the wire 131 is shown as extending between terminals 38 of juxtaposed units. It will thus be seen that the units defining the first toasting compartment are arranged in series and the units comprising the third toasting compartment are arranged in series while the second toasting compartment is heated by portions of the heating elements of the first and the third toasting compartments. This arrangement is shown in Fig. 10 wherein the units of the first toasting compartment are indicated by A and the units of the third toasting compartment are indicated by B. In Fig. 10 the source of current is shown as being of the 3-wire type wherein a so-called neutral or middle wire 132 is provided. The hot or outside wires are represented by 133 and 134. As is well understood in the art these leads 133 and 134 may be either connected to the outside wires of a so-called Edison 3-wire system or they may be connected to one outside wire or to one terminal of a suitable source of current in order that a difference in potential may be attained between the leads 133 and 134 and the lead 132.

As has been stated previously the device is arranged so that the bread falling into the toast receiving compartment 13 will be maintained in a heated condition. This is accomplished by permitting the portions 130 of the various elements to remain in heated condition during the operation of the toaster. A main control switch 135 is provided which controls the input from the leads 133 and 134. The switch 135 serves to close the circuit between the leads 133 and 136 and 134 and 137. The leads 136 and 137 are connected to terminals 138 and 139 and lead 140 connects the terminal 138 to the contact 121 and the lead 142 connects the terminal 139 to the contact 120. Lead 143 is connected to the terminal 139 and serves to conduct current to the low temperature windings of the heating units D and E which are arranged substantially similar to the units A and B. A lead 144 is connected to the terminal 138 and conducts current to the windings 130 of the heating elements A, B and C. A lead 145 is connected to the windings 129 of the elements C D and E. A lead 146 conducts current to the elements 129 of the heating elements A and B. It will thus be seen that when all the elements are in operation the load is equally distributed between the main supply leads 133 and 134.

In operation, a plurality of untoasted slices of bread are introduced through the openings 49 into the toasting compartments 12. The handle 62 is then moved so as to be set in a predetermined position depending upon the length of time it is desired to toast the bread which will best be determined by experimentation. At a predetermined time during the operation, when the bread has been completely toasted, the boss 98 will engage the latch 95, which in turn will engage dog 91, and release the bifurcated end portions 87 so as to permit the spring 89 to move the arm 81 and, therefore, move the bar 55 to permit the portions 59 to fall into the slots 99. Therefore the shelves 50 will move downwardly into a vertical position and the bread will fall from the compartments 12 into the toast receiving compartment 13. A short interval after the bread has fallen from the toasting compartment into the toast receiving compartment the bar 103 will engage the arm 115 and will move it in a manner hereinbefore set forth to reset the bar 55 and the shelves 50. It is to be understood that prior to the setting of the handle 62, the switch 135 will have been moved into circuit closing position. At the time the bar 103 acts to cause the shelves 50 to resume horizontal position the circuit to the high temperature windings 129 is interrupted as has been set forth. However, since the low temperature windings 130 are connected behind the contacts 120 and 121 the circuit to these low temperature windings will not be broken and they will therefore serve to heat toast receiving compartment 13. When desired fresh slices of bread will be introduced into the toast receiving compartments and the handle 62 will be reset in the manner described and operation will be continued in a manner hereinbefore set forth. By opening the door 20 access may be attained to the toast receiving compartments 13 and toast will be withdrawn therefrom as required as the same will be maintained in heated condition. When it is desired to stop operation the switch 135 will be turned to neutral position and obviously the circuit to the device will then be interrupted.

In the foregoing description we have described a toaster which comprises a plurality of toasting compartments but it is to be distinctly understood that this device may be used in connection with mechanism providing one or more toasting compartments without departing from the purview of our invention. It is also to be understood that while we prefer to use asbestos as the base upon which our windings are to be wound so as to prevent heat escapement and radiation into the adjacent compartment this might be dispensed with without departing from the scope of our invention and it is also to be understood that variations may be made in the electrical connections as we contemplate arranging the device in a number of different ways other than that we have described. It is also to be understood that the particular arrangement of the toast receiving compartments might be varied as well as other mechanisms without departing from the spirit of the invention.

While we have illustrated and described the preferred form of construction for carrying our invention into effect, this is capable of variation and modification without departing from the spirit of the invention. We, therefore, do not wish to be limited to the precise details of construction set forth but desire to avail ourselves of such variations and modifications as come within the scope of the appended claims.

Having described our invention, what we claim as new and desire to protect by Letters Patent is:

1. In a device of the class described, a plurality of toasting compartments, a toast receiving compartment, and means disposed between said toasting and said toast receiving compartments for supporting slices of bread in said toasting compartments including a tiltable member below each of said toasting compartments, means for holding said supporting means in supporting position and movable from engagement with said supporting means to permit said supporting means to fall from supporting position whereby to permit said slices of bread to pass from said toasting compartments into said toast receiving compartment, and means acting on said holding and supporting means for simultaneously resetting all of said tiltable members into slice supporting position.

2. In a device of the class described, toasting compartments, a toast receiving compartment, and means disposed between said toasting and said toast receiving compartments for supporting slices of bread in said toasting compartments, means for holding said supporting means in supporting position and movable from engagement with said supporting means to permit said supporting means to fall from supporting position to permit said slices of bread to pass from said toasting compartments into said toast receiving compartment, heating elements for toasting the bread in said toasting compartment, and means controlling the operation of said heating elements whereby a portion of said heating elements may be rendered inoperative after said bread passes from said toasting compartments whereby the remaining operative portions of said heating elements may serve to heat said toast receiving compartment.

3. In a toasting device, means providing toasting compartments, shelf members pivotally mounted at the lower ends of said toasting compartments having crank portions provided thereon, a slidably supported bar having notches therein, said crank members having portions adapted to rest on said bar to hold said shelf members in supporting position relative to said toasting compartments, and means for moving said slidable bar to position said notches below said crank members to permit said crank members to move into said notches to permit said shelf members to move from supporting position relative to said toasting compartments.

4. In a toasting device, means providing toasting compartments, shelf members pivotally mounted at the lower ends of said toasting compartments having crank members provided thereon, a slidably supported bar having notches formed therein, said crank members having portions rested on said bar to hold said shelf members in supporting position relative to said toasting compartments, and means for moving said slidable bar to position said notches below said crank members to permit said crank members to move into said notches to permit said shelf members to move from supporting position relative to said toasting compartments, said notches having a formed surface on one of the edges thereof, and means for moving said slidable bar to bring said formed edges into engagement with said crank members to move said shelf members into supporting position relative to said toasting compartments.

5. In a toasting device, means providing toasting compartments, shelf members, shaft members for supporting said shelf members at the lower ends of said toasting compartments said shaft members having cranks at one of the ends thereof, a slidably supported bar disposed below said crank portions to engage said crank portions to hold said shelf members in supporting position relative to said toasting compartments, a pivotally mounted arm, means for connecting said arm to one end of said slidably mounted bar, spring means for urging said arm in one direction, latch means for holding said arm against the action of said spring member, time controlled means for releasing said latch means, said slidable bar having notches formed therein, said time controlled means releasing said latch means to permit said pivotally mounted arm to be moved by said spring means whereby said slidably mounted bar may be moved to bring said notches into position below said crank members to permit said crank members to pass into said notches to permit said shelf members to pass from the supporting position relative to said toasting compartments.

6. In a toasting device, means providing toasting compartments, shelf members, shaft members for supporting said shelf members at the lower ends of said toasting compartments, said shaft members having cranks at one of the ends thereof, a slidably supported bar disposed below said crank portions to engage said crank portions to hold said shelf members in supporting position relative to said toasting compartments, a pivotally mounted arm, means for connecting said arm to one end of said slidably mounted bar, spring means for urging said arm in one direction, latch means for holding said arm against the action of said spring member, time controlled means for releasing said latch means, said slidable bar having notches formed therein, said time controlled means releasing said latch means to permit said pivotally mounted arm to be moved by said spring means whereby said slidably mounted bar may be moved to bring said notches into position below said crank members to permit said crank members to pass into said notches to permit said shelf members to pass from the supporting position relative to said toasting compartments, said notches having a formed edge, said time controlled means actuating means for moving said pivotally mounted arm to bring said formed edges into engagement with said crank members whereby said formed edges will act on said crank members to pivot said shafts to move said shelf members into supporting position relative to said toasting compartments, said means serving to reposition said latch member to hold said bar against movement to retain said shelf members in supporting position relative to said toasting compartments.

7. In a toasting device, toasting means including a plurality of toasting compartments, tiltable supporting means for supporting slices of bread to be toasted in each of said toasting compartments, means for holding said supporting means in supporting position, means for urging said holding means from holding position to release said tiltable means and allow said slices to fall from said compartments, means for retaining said holding means in holding position against the action of said urging means, and means acting on said holding and supporting means for simultaneously resetting all of said tiltable supporting means into slice supporting position.

8. In a toasting device, toasting means including a plurality of toasting compartments, tiltable supporting means for supporting slices of bread to be toasted in each of said toasting compartments, means for holding said supporting means in supporting position, means for urging said holding means from holding position to tilt said supporting means and allow said slices to fall from said compartments, means for retaining said holding means in holding position against the action of said urging means, time controlled means for controlling the operation of said last named means, and means acting on said holding and supporting means for simultaneously resetting all of said tiltable supporting means into slice supporting position.

9. In a toasting device, electrically operated toasting means including a plurality of toasting compartments, means for controlling the current supply to said toasting means, supporting means for supporting slices of bread to be toasted in said toasting compartments including tiltable members, means for holding said supporting means in said supporting position, means for urging said holding means from holding position to release said tiltable members and discharge said slices therefrom, and means for retaining said holding means in holding position against the action of said urging means, and means acting on said holding and supporting means for simultaneously resetting all of said tiltable members.

10. In a toasting device, electrically operated toasting means, means for controlling the current supply to said toasting means, supporting means including a plurality of tiltable members for supporting slices of bread to be toasted in said toasting means, means for holding said supporting means in said supporting position, means for urging said holding means from holding position to release said tiltable members and discharge said slices therefrom, and means for retaining said holding means in holding position against the action of said urging means, said urging means including means for controlling the operation of said current supply controlling means, and means acting on said holding and supporting means for simultaneously resetting all of said tiltable members into slice supporting position by one manual operation, said tiltable members including rotatable crank portions, said last named means including a slidable bar controlling rotation of said crank portions.

11. In a toasting device, electrically operated toasting means, supporting means including a plurality of tiltable members for supporting slices of bread to be toasted in said toasting means, means for holding said supporting means in said supporting position, means for urging said holding means from holding position to release said tiltable members and discharge said slices therefrom, means for retaining said holding means in holding position against the action of said urging means, means operable with said last named means for regulating the current supply to said electrically operated toasting means, and means acting on said holding and supporting means for simultaneously resetting all of said tiltable members into slice supporting position by one manual operation, said tiltable members including rotatable crank portions, said last named means including a slidable bar controlling rotation of said crank portions, said bar having notches therein defining arcuate shoulders adapted to engage said crank portions when said bar is released from said holding means and said bar is moved to permit said crank portions to fall into said notches.

12. In a toasting device, electrically operated toasting means, supporting means for supporting slices of bread to be toasted in said toasting means, means for holding said supporting means in said supporting position, means for urging said holding means from holding position, means for retaining said holding means in holding position against the action of said urging means, and means operable with said last named means for interrupting a portion of the current supply to said electrically operated toasting means.

In testimony whereof we affix our signatures.

DANIEL F. H. SCHROEDER.
JOHN H. LANGENFELD.
CHARLES FRYER.